US007541312B2

(12) United States Patent
Dietz et al.

(10) Patent No.: US 7,541,312 B2
(45) Date of Patent: Jun. 2, 2009

(54) POROUS CARBONS FROM CARBOHYDRATES (75) Inventors: Steven Dietz, Denver, CO (US); Dean Recla, Arvada, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 839 days.

(21) Appl. No.: 10/955,376

(22) Filed: Sep. 30, 2004

(65) Prior Publication Data
US 2005/0207962 A1 Sep. 22, 2005

Related U.S. Application Data (60) Provisional application No. 60/554,209, filed on Mar. 18, 2004.

(51) Int. Cl.
*C01B 31/02* (2006.01)
(52) U.S. Cl. .................................. 502/432; 423/445 R
(58) Field of Classification Search ................. 502/432; 423/445 R
See application file for complete search history.

(56) References Cited

U.S. PATENT DOCUMENTS

| | | | |
|---|---|---|---|
| 3,875,270 A | 4/1975 | Haefner et al. ................. 264/6 |
| 4,256,773 A | 3/1981 | Itoga et al. | |
| 4,409,125 A | 10/1983 | Nishino et al. | |
| 4,594,287 A | 6/1986 | Hucke ..................... 528/320.2 |
| 4,756,898 A | 7/1988 | Hopper et al. ............. 423/449 |
| 4,806,290 A | 2/1989 | Hopper et al. ................ 264/28 |
| 4,843,103 A | 6/1989 | Albertelli et al. ............. 521/83 |
| 4,873,218 A | 10/1989 | Pekala ........................ 502/64 |
| 4,997,804 A | 3/1991 | Pekala ....................... 502/418 |
| 5,081,163 A | 1/1992 | Pekala ........................ 521/187 |
| 5,086,085 A | 2/1992 | Pekala ........................ 521/187 |
| 5,102,855 A | 4/1992 | Greinke et al. | |
| 5,250,576 A | 10/1993 | Des Marais et al. ........... 521/63 |
| 5,318,797 A | 6/1994 | Matijevic et al. ........ 427/213.31 |
| 5,402,306 A | 3/1995 | Mayer et al. ................ 361/502 |
| 5,476,878 A | 12/1995 | Pekala ........................ 521/61 |
| 5,521,008 A | 5/1996 | Lieberman et al. | |
| 5,556,892 A | 9/1996 | Pekala ........................ 521/181 |
| 5,792,945 A | 8/1998 | Murakami ................. 73/64.48 |
| 5,863,958 A | 1/1999 | Dyer et al. ................... 521/63 |
| 5,908,896 A | 6/1999 | Mayer et al. ................. 524/596 |
| 5,925,408 A | 7/1999 | Tan ............................ 427/228 |
| 5,932,185 A | 8/1999 | Pekala et al. ................. 423/445 |
| 5,956,225 A | 9/1999 | Okuyama et al. | |
| 5,993,996 A | 11/1999 | Firsich ....................... 429/231.8 |
| 6,024,899 A | 2/2000 | Peng et al. ................. 264/29.1 |
| 6,031,711 A | 2/2000 | Tennent et al. ............... 361/303 |
| 6,064,560 A | 5/2000 | Hirahara et al. | |
| 6,121,336 A | 9/2000 | Okoroafor et al. ........... 521/112 |
| 6,225,257 B1 * | 5/2001 | Putyera et al. ............... 502/432 |
| 6,297,293 B1 | 10/2001 | Bell et al. | |

6,631,073 B1 10/2003 Sakata et al.

FOREIGN PATENT DOCUMENTS

| | | |
|---|---|---|
| EP | 0 467 486 | 1/1992 |
| EP | 1049116 A1 | 11/2000 |
| EP | 1094478 A2 | 4/2001 |
| EP | 1 288 160 A1 | 3/2003 |

OTHER PUBLICATIONS

Bansal, Roop Chand, et al., "Porous Structure of Active Carbons," Active Carbon, 1998, pp. 119-163, Cover (2-pgs.), Marcel Dekker, Inc., New York, USA.
Barrett, Elliott P., et al., "The Determination of Pore Volume and Area Distributions in Porous Substances. I. Computations from Nitrogen Isotherms," Mellon Institute, Jan. 1951, pp. 373-380, vol. 73, Baugh and Sons Company.
Farmer, Joseph C., et al., "Capacitive Deionization of NaCl and NaNO3 Solutions with Carbon Aerogel Electrodes," J. Electrochemical Society, Jan. 1996, pp. 159-169, vol. 143, The Electrochemical Society, Inc.
Gregg, S.J., et al., "The Physical Adsorption of Gases by Mesoporous Solids: The Type IV Isotherm," Adsorption, Surface Area and Porosity, 1982, pp. 111-194, Cover (2 pgs.), Second Edition, Academic Press, London, Great Britain.
Jun, Shinae, et al., "Synthesis of New, Nanoporous Carbon with Hexagonally Ordered Mesostructure," American Chemical Society, 2000, pp. 10712-10713, vol. 122, USA.
Kinoshita, Kim, "Chemical Reactions," Carbon Electrical and Physicochemical Properties, 1988, pp. 174-225, Cover (2 pgs.), John Wiley & Sons, USA.
Oren, Y., et al., "Electrochemical Parametric Pumping," J. Electrochemical Society, Jun. 1978, pp. 869-875, vol. 125, No. 6, Electrochemical Science and Technology.
Pekala, R.W., et al., "Structure and Performance of Carbon Aerogel Electrodes," Mat. Res. Soc. Symp. Proc., 1994, pp. 79-85, vol. 349, Materials Research Society.
Huang, Xiao-Wen, et al., "Properties of Electric Double-layer Capacitors Using Activated Carbon Prepared from Pyrolytic Treatment of Sugar as Their Electrodes," Chemical Journal of Chinese Universities, Feb. 2002, pp. 291-293, vol. 23.

(Continued)

*Primary Examiner*—Stuart Hendrickson
(74) *Attorney, Agent, or Firm*—Greenlee, Winner and Sullivan, P.C.

(57) ABSTRACT

A porous carbon characterized by a volumetric pore size distribution having two peaks, a first of said peaks being between 0.5 and 1.0 nm and a second of said peaks being between 1.0 and 5.0 nm. The porous carbon may have a volumetric capacitance in an organic electrolyte of at least 40 $F/cm^3$, an average pore diameter between about 2 nm and about 30 nm, a surface area of at least 900 $m^2/g$, and/or a density of at least 0.4 $g/cm^3$. A method for making such a carbon includes a) curing a mixture comprising a carbohydrate, a dehydrating component, and a nonmetallic cationic pore-forming agent and b) carbonizing the cured carbon under conditions effective to provide a porous carbon having a surface area between about 100 $m^2/g$ and about 3000 $m^2/g$. The the dehydrating component and nonmetallic cationic component may comprise two moieties of one compound.

37 Claims, 2 Drawing Sheets

OTHER PUBLICATIONS

Xing, W., et al., "Optimizing Pyrolysis of Sugar Carbons for Use as Anode Materials in Lithium-Ion Batteries," J. Electrochemical Society, Oct. 1996, pp. 3046-3052, vol. 143, No. 10, The Electrochemical Society Inc.

Xing, Weibing, et al., "Studies of Lithium Insertion in Ballmilled Sugar Carbons," J. Electrochemical Society, Jan. 1998, pp. 62-70, vol. 145, No. 1, The Electrochemical Society, Inc.

Yoon, Songhun, et al., "Electric Double-Layer Capacitor Performance of a New Mesoporous Carbon," Journal of The Electrochemical Society, 2000, pp. 2507-2512, vol. 147, No. 7, The Electrochemical Society, Inc.

International Search Report (Jul. 19, 2006).

A. Monnier, et al; *Cooperative Formation of Inorganic-Organic Interfaces in the Synthesis of Silicate Mesostructures*; Science, vol. 261, Sep. 3, 1993 (pp. 1299-1303).

John M. Thomas; *The Chemistry of Crystalline Sponges*; Nature, vol. 368, Mar. 24, 1994 (pp. 367-368).

Olsheng Huo, et al; *Generalized Synthesis of Periodic Surfactant/Inorganic Composite Materials*; Nature, vol. 368, Mar. 24, 1994; (pp. 317-319)/.

C. T. Kresge, et al; *Ordered Mesoporous Molecular Sieves Synthesized by a Liquid-Crystal Template Mechanism*; Nature, vol. 359, Oct. 22, 1992; (pp. 710-712).

William R. Even, Jr., et al *Emulsion-Derived Foams: Preparation, Properties, and Application*; Mrs Bulletin Apr. 1994; (pp. 29-33).

J. S. Beck; *Molecular or Supramolecular Templating: Defining the Role of Surfactant Chemistry in the Formation of Microporous and Mesoporous Molecular Sieves*; American Chemical Society; Chem. Mater. vol. 6, No. 10, 1994; (pp. 1816-1821).

R. R. Lagasse, et al; *High Surface Area, High Permeability Carbon Monoliths*; Organic Materials Processing Dept., Sandia National Laboratories, Albuquerque, NM; 1994; (pp. 7).

J. D. LeMay, et al; *Low-Density Microcellular Materials*; MRS Bulletin/Dec. 1990; (pp. 19-45).

R. W. Pekala, et al; *Carbon Aerogels: An Update on Structure, Properties, and Applications*; Lawrence Livermore National Laboratory; 1994; (pp. 369-377).

R. W. Pekala, et al; *Aerogels Derived From Multifunctional Organic Monomers*; Elsevier Science P {ublication B.V. 0022-3093 1992 (pp. 90-98).

D. Myers; *Surfactant Science and Technology*; VCH Publishers; 1846; (pp. 172-177.

V. Luca, et al; *Synthesis and Characterization of Mesostructured Vanadium Oxide*; American Chemical Society, 1995; Chem. Mater. 1995, (pp. 2220-2223).

S. Bagshaw, et al; *Templating of Mesoporous Molecular Sieves by Nonionic Polyethylene Oxide Surfactants*; Science, vol. 269, Sep. 1, 1995; (pp. 1242-1244).

J. S. Beck, et al; *A New Family of Mesoporous Molecular Sieves Prepared with Liquid Crystal Templates*; J. Am. Chem. Soc. 1992; (pp. 10834-10843).

PCT International Search Report for International Application No. PCT/US0/25244, dated Dec. 21, 2000, (6 p.).

Supplementary European Search report, Corresponding to European Application No. EP 05 72 7193, Mailed Oct. 7, 2008.

Jun et al., "Synthesis of new, Nanoporous Carbon with Hexagonally Ordered Mesostructure", J. Am. Chem. Soc. 2000, 122, 10712-10713.

* cited by examiner

Fig. 3

POROUS CARBONS FROM CARBOHYDRATES

STATEMENT REGARDING FEDERALLY SPONSORED RESEARCH OR DEVELOPMENT

The research carried out in connection with this invention was funded by National Science Foundation Grant Nos. DMI-0216299 and DMI-9901792.

CROSS-REFERENCE TO RELATED APPLICATIONS

Not applicable.

FIELD OF THE INVENTION

The present invention discloses a method of making a porous carbon wherein the method comprises curing a mixture comprising at least one carbohydrate, at least one dehydrating component, and at least one nonmetallic cationic component. The method further comprises carbonizing a carbon in a manner sufficient to obtain a porous carbon characterized by an average pore diameter between about 2 nm and about 50 nm; a surface area between about 100 $m^2/g$ and about 3000 $m^2/g$, and in some embodiments pores with size distribution peaks within each of the ranges of 0.5 to 1.0 nm and 1.0 to 5.0 nm.

BACKGROUND OF THE INVENTION

Porous carbons are versatile materials because of their extended surface area and microporous structure. They find application as filters, membranes, sorbents and catalyst supports for materials in both gas and liquid phases. Porous carbons also find use in the treatment and remediation of domestic and industrial wastewaters. See, for example, Bansal, R. C., J.-B. Donnet and F. Stoeckli (1988), *Active Carbon*, Marcel Dekker: New York. In addition, carbon is extensively used as an electrode material as described in Kinoshita, K. (1988), *Carbon: Electrochemical and Physicochemical Properties*, John Wiley & Sons: New York.

The properties and suitability of porous carbons toward specific applications is dictated in large measure by the precise character of the porosity of the carbon. In particular, the size, shape and the distribution in size of pores heavily influence the characteristics of the porous material and its suitability for a given application. Pore structures can assume a multitude of shapes and configurations each varying in shape, depth and width. The interior of a pore can differ markedly from the cross-section presented on the external surface of the porous material with respect to both shape and size. Some exemplary pore structures include tubular capillaries, open or closed capillaries, ink-bottle-shaped capillaries, open slit-shaped capillaries and spheroidal pores. The way in which a pore is measured depends upon the shape of the pore: cylindrical pores are measured according to their diameter while slit-shaped pores are measured across their shortest dimension. Pores having characteristic dimensions (diameter or width) less than 2 nm are defined as micropores, those greater than 50 nm are macropores and those between 2 and 50 m are considered to be mesopores. The definition and size range encompassed by the term mesopore is well-accepted within the art and conforms to the convention adopted by the IUPAC; see for example, Bansal, R. C., J.-B. Donnet and F. Stoeckli, *Active Carbon* (1988) pp. 119-163.

Experimentally, porosity data may be acquired from nitrogen isotherms and pore size distribution plots. A nitrogen isotherm is a plot of the volume of nitrogen gas adsorbed and desorbed as a function of relative pressure measured at constant temperature. As described in *Adsorption Surface Area and Porosity* by S. Gregg and K. Sing, Academic Press: New York, 1982, these isotherms can be categorized into one of four types based on the shape of the plot. Type I isotherms feature a nearly horizontal plateau and little or no difference between the adsorption and desorption traces. However, Type IV isotherms are characterized by two inflection points and a difference in the adsorption and desorption isotherms, known as hysteresis. Type I isotherms are associated with microporous materials while Type IV isotherms are associated with the presence of mesopores. Thus, hysteresis is diagnostic of mesoporous materials.

It has been found that porous carbons characterized by a high proportion of mesopores are preferred for certain liquid-phase applications because of a unique profile of characteristics. For example, mesopores are more easily filled by electrolytes, which enhances their utility as electrodes when the carbon must be in intimate contact with a liquid electrolyte. The presence of a hysteresis loop in the nitrogen adsorption/desorption isotherm may be indicative of a mesoporous material. Mesoporosity can also be diagnosed via a pore size distribution plot that can be obtained according to the method of Barrett et al., J. Am. Chem. Soc. (1951), vol. 73, pp. 373-380, incorporated herein by reference.

Methods of manufacturing porous carbons influence the character and distribution of pores. Most methods give a distribution of pore sizes including micro-, meso-, and macro-pores. Those trying to make mesoporous carbons have attempted to change this distribution to increase the proportion of mesopores.

It has been known for some time that carbohydrates can be dehydrated to a carbon product. For example, carbon can be produced by the addition of concentrated sulfuric acid to common table sugar (sucrose) to produce carbon. High temperature treatment of such polymerized carbons under an inert atmosphere at temperatures in excess of 900° C. produces porous carbons of surface areas approaching 10 $m^2/g$.

Some in the art have attempted to make mesoporous carbons in the presence of pore-forming materials and carbon precursors. For example, U.S. Pat. No. 6,024,899 to Peng et al. relates to making mesoporous carbon by combining a carbon precursor and pore-forming materials, wherein a pore former is preferably a thermoplastic material, e.g. polyvinylbutyrals (PVB), polyethylene glycols (PEG), heavy petroleum fractions and/or coal liquids.

U.S. Pat. No. 6,279,293 to Bell et al. discloses a mesoporous material prepared by polymerizing a resorcinol/formaldehyde (RF) system from an aqueous solution containing resorcinol, formaldehyde and a surfactant capable of stabilizing the electrostatic interactions between the monomer and surfactant. The surfactant may be cationic, anionic or nonionic with suitable surfactants including cetyltrimethylammonium chloride and cetyltrimethylammonium bromide, sodium dodecylbenzenesulfonic acid and sodium bis(2-ethylhexyl)sulfosuccinate, and Brij 30.

According to Jun et al. (2000) "Synthesis of New, Nanoporous Carbon with Hexagonally Ordered Mesostructure," J. Am. Chem. Soc. Vol. 122, pp. 10712-10713 and the references contained therein, the synthesis of ordered nanoporous carbon materials was carried out using SBA-15, sucrose, and sulfuric acid wherein SBA-15 is an ordered mesoporous silica molecular sieve consisting of an hexagonal arrangement of cylindrical mesoporous tubes 9 nm in diameter.

Despite these advances within the art, research continues toward discovering and developing methods of making high surface area, mesoporous carbons that are: inexpensive, easy to implement and amenable to reliable duplication. In addition, there remains a need for applying such methods to the manufacture of select articles such as electrodes for ultracapacitors and capacitive deionization technology (CDT). It is anticipated that the mesoporous, high surface area carbons made from the present method will find particular use in applications that demand careful control over the number of mesopores, such as certain liquid phase and catalytic applications.

Water can be rendered undrinkable by virtue of dissolved salts, dirt or microorganisms. Treatment of brackish waters has heretofore primarily been carried out by a process of reverse osmosis (RO). Reverse osmosis can be understood if one considers two volumes of solution separated by a membrane through which solvent can pass but dissolved solutes cannot. Solvent will flow across the membrane from low to high solute concentration in a process described as osmosis. The pressure needed to counter the flow of solvent from low to high solute concentration is known as the osmotic pressure. Pressures in excess of the osmotic pressure may be used to reverse the flow of solvent such that solvent will flow from high to low solute concentration. It is upon this principle that reverse osmosis obtains pure water from brine. Reverse osmosis on a practicable scale is costly due to the large amount of energy required to generate sufficient pressure to overcome the osmotic pressure across a membrane at significant brine volumes. See, for example, Farmer et al. (1996), "Capacitive Deionization of NaCl and $NaNO_3$ Solutions with Carbon Aerogel Electrodes," J. Electrochem. Soc. 143, 159-169.

Alternatively, capacitive deionization technology (CDT) can be used to purify undrinkable water by passage of brackish water through a charged capacitor consisting of pairs of porous parallel electrodes maintained at a given potential difference. Dissolved salts, and microorganisms present in undrinkable water as charged species are attracted and bound to oppositely charged electrodes. The electrodes are used until they become saturated thereby requiring regeneration. Regeneration comprises removal of the applied potential and concomitant flushing to allow trapped ions and charged particles to migrate from the electrodes; contaminants are carried away as a concentrated brine stream. The energy required to operate a CDT system is substantially less than that required to drive reverse osmosis for an equivalent volume of liquid. CDT is therefore significantly less expensive to operate than reverse osmosis (RO). Broad adoption of CDT has been heretofore prevented by the high cost of manufacturing CDT electrodes which exceeds the capital cost of competing reverse osmosis systems. Others in the art have previously made CDT electrodes by a process comprising impregnating a carbon paper support with an aqueous resorcinol-formaldehyde solution, polymerizing the solution to obtain the resorcinol-formaldehyde resin impregnated upon the support, extracting the solvent from the resin/support, and pyrolyzing the resin/support to a carbon aerogel electrode. This process is deficient in more than one respect. It is an expensive process due to the relatively high cost of the resorcinol starting material and the high costs associated with the extraction step, said extraction employing, for example, supercritical carbon dioxide. Moreover, the electrodes obtained from the process are characterized by a relatively low surface area and therefore low capacity. The low capacity of the electrodes requires that a plurality of electrodes be used for an effective CDT system.

Another application for mesoporous carbons are as electrodes for ultracapacitors. Ultracapacitors based on double-layer capacitance store energy in a polarized liquid layer only a few angstroms thick at the interface between an ionically conducting electrolyte solution and an electronically conducting electrode. The separation of charge in the ionic species at the interface (called a double layer) produces a standing electric field. If other factors are equal, the larger the electrode surface area the more charge can be stored. In addition, because no chemical reactions take place during the charge/discharge cycle, these devices can be cycled many times without degradation.

There are two major categories of electrolytes for double layer ultracapacitor devices, aqueous and organic, each of which has their own set of advantages and disadvantages. Aqueous electrolytes such as potassium hydroxide and sulfuric acid have low resistance and can be charged and discharged very quickly, making them suitable for high power applications. However, they can only be cycled through a potential range of about one volt due to the voltage limits of aqueous electrolytes; this sharply limits their energy storage density (which is proportional to voltage squared). Organic electrolytes, such as $NEt_4BF_4$ dissolved in propylene carbonate or acetonitrile, have much higher decomposition voltages (up to three volts) and therefore have much greater energy storage densities (in theory, by a factor of nine). However, because they have much higher resistance, they cannot be charged or discharged as quickly, limiting them to low power density applications.

SUMMARY OF THE INVENTION

In one aspect, the present invention discloses a method of making a mesoporous carbon. According to one embodiment of the present method, the porous carbon preferably is characterized by an abundance of mesopores. The present method comprises of (a) curing a mixture under conditions effective to provide a carbon; and (b) carbonizing the carbon under conditions effective for providing a porous carbon. The cured mixture preferably comprises (i) at least one carbohydrate, (ii) at least one dehydrating component, and (iii) at least one nonmetallic cationic component.

The present invention includes mesoporous carbons made according to the method recited hereinabove and includes carbonaceous electrodes made from said mesoporous carbons. The porous carbon is characterized by an average pore diameter between about 2 nm and about 50 nm; and a surface area between about 100 $m^2/g$ and about 3000 $m^2/g$. In some cases, the present mesoporous carbon is further characterized by a density of at least 0.4 $g/cm^3$, a volumetric capacitance of at least 40 $F/cm^3$, and/or in some embodiments a pore size distribution having peaks within each of the ranges of 0.5 to 1.0 nm and 1.0 to 5.0 nm.

In yet another aspect of the present invention is disclosed a method of making carbonaceous electrodes. The electrodes are preferably characterized by an average pore diameter between about 2 nm and about 50 nm; a surface area between about 100 $m^2/g$ and about 3000 $m^2/g$; a density of at least 0.4 $g/cm^3$, a volumetric capacitance of at least 40 $F/cm^3$, and/or in some embodiments a pore size distribution having peaks within each of the ranges of 0.5 to 1.0 nm and 1.0 to 5.0 nm.

A primary feature of the present invention is the development of a low-cost method to prepare high surface area carbons with an increased proportion of mesopores from carbohydrates (sucrose, fructose, glucose, corn syrup, starch, cellulose etc.). This was accomplished by adding aqueous solutions of cationic nonmetal salts and a dehydrating component to the carbohydrate followed by heat processing. Typically carbons derived from carbohydrates have low surface areas and are microporous. The introduction of nonmetal salts to the formulations results in the creation of mesoporosity and increased surface areas. These carbons have been tested as electrodes for ultracapacitors and capacitive deionization. The current method further discloses a way to manufacture carbon electrodes useful for CDT less expensively than heretofore possible.

BRIEF DESCRIPTION OF THE DRAWINGS

For a more detailed understanding of the invention, reference will be made to the following Figures, wherein.

DETAILED DESCRIPTION OF THE INVENTION

Definitions

As used herein a porous carbon shall refer to any porous, carbonaceous material comprising at least 75 wt % elemental carbon and characterized by a BET surface area of at least 100 $m^2/g$. As used herein the term carbonization shall refer to any process that effects a chemical structural change and results in a carbonaceous product. A porous material as used herein shall be defined as any material characterized by a network of pores and/or channels.

Method of Making Mesoporous Carbon

The present invention discloses a method of making a porous carbon comprising the steps of (a) forming and curing a mixture under conditions effective to provide a carbon; and (b) carbonizing the carbon under conditions effective for providing a porous carbon. Step (a) preferably entails evaporating all or substantially all liquid that may be present in the mixture. In some embodiments, the liquid may be water and the other components of the mixture may be dissolved in the water. In other embodiments, described below, at least some of the components may be insoluble in the liquid. In certain embodiments, the porous carbon formed in step (a) is substantially monolithic. The cured carbon may be pulverized or ground into particles having an average size less than 5 mm.

The resulting porous carbon is characterized by an average pore diameter between about 2 nm and about 50 nm; and a surface area between about 100 $m^2/g$ and about 3000 $m^2/g$. The mixture preferably comprises (i) at least one carbohydrate, (ii) at least one dehydrating component, and (iii) at least one nonmetallic cationic component. In preferred embodiments, the nonmetallic cationic component is neither a hydroxide nor an amine.

As described hereinabove, carbohydrates are, by definition, hydrates of carbon comprising carbon and water. An almost infinite number of carbohydrate types are suitable for use in the current invention including sugars, cellulose, starch, polysaccharides, monosaccharides and oligosaccharides. It should be noted that both soluble carbohydrates such as starch and sucrose, as well as insoluble carbohydrates such as cellulose are equally applicable in the current invention. Preferred carbohydrates are glucose, fructose, maltose, sucrose, galactose, starch, corn syrup, high-fructose corn syrup, cellulose, lactose, glyceraldehyde, dihydroxyacetone and cellobiose. According to one preferred embodiment, sucrose is the carbohydrate. According to yet another preferred embodiment, cellulose is the preferred carbohydrate.

The mixture further comprises (ii) at least one dehydrating component, and (iii) at least one nonmetallic cationic component. According to one embodiment, (ii) at least one dehydrating component, and (iii) at least one nonmetallic cationic component are components from separate compounds. For example, according to one embodiment, a dehydrating component is sulfuric acid ($H_2SO_4$) and a nonmetallic cationic component is the ammonium cation ($NH_4^+$) of ammonium sulfate ($NH_4(SO_4)_2$). Suitable dehydrating components are those compounds or components of compounds that are capable of catalyzing a net removal of water from carbohydrates under suitable conditions. There exist a large number of agents in the chemical arts that could serve as dehydrating agents according to the requirements recited herein. Suitable dehydrating components include sulfuric, phosphoric, sulfurous, phosphorous, chlorous, hypochlorous, hypobromous, hypoiodous, periodic, perchloric, nitric, nitrous, iodic, hydrochloric, toluenesulfonic, oxalic and methanesulfonic acids. Sulfuric acid is a preferred dehydrating component according to one embodiment.

The nonmetallic cationic component may be derived from the cationic component of a salt. In such cases, the nonmetallic cationic component will be accompanied by some anionic counterion, both ions forming a salt, for example. According to one preferred embodiment, the nonmetallic cationic component is an ammonium cation. There exist many ammonium cations suitable for the present invention. The ammonium cations may be substituted with a variety of combinations of substituent groups. The ammonium cations may be unsubstituted, primary, secondary, tertiary or quaternary. Preferably, the ammonium cation has the formula $NR^1R^2R^3R^4$ wherein $R^1$, $R^2$, $R^3$, and $R^4$ may be the same or different and are selected from the group consisting of H, $CH_3$, $CH_2CH_3$, $CH_2CH_2CH_3$, $CH(CH_3)_2$, $CH_2(CH_2)_2CH_3$, $CH(CH_3)CH_2CH_3$, $CH_2CH(CH_3)_2$, $C(CH_3)_3$, $CH_2(CH_2)_{14}CH_3$, $CH_2(CH_2)_4CH_3$, $CH_2(CH_2)_5CH_3$, $CH_2(CH_2)_3CH_3$, $CH_2(CH_2)_6CH_3$, $CH_2(CH_2)_{10}CH_3$, $CH_2(CH_2)_{12}CH_3$, and hexadecyltrimethyl-ammonium bromide (CTAB). According to other embodiments, the nonmetallic cationic component is diamine, polyethyleneimine, triphenylmethane, or phosphonium.

Alternatively, according to another embodiment, (ii) at least one dehydrating component, and (iii) at least one nonmetallic cationic component comprise two moieties of a single compound. According to this embodiment, the dehydrating component and nonmetallic cationic component are added to the mixture as one chemical compound. Nonmetallic salts comprising a dehydrating component anion and nonmetallic cation are exemplary single compounds according to this embodiment. Suitable dehydrating component anions according to this embodiment will include at least one group or atom that imparts sufficient acidity to the anion to effect the dehydrating action of the dehydrating component. Bisulfate is an exemplary dehydrating component according to this embodiment.

The nonmetallic cationic components according to this embodiment are substantially similar to those described above in connection with other embodiments of this invention and shall contain cations selected from ammonium, phosphonium, carbenium ions and the like. By way of example only, the compound could be ammonium hydrogen sulfate, tetramethylammonium hydrogen sulfate or cetyltrimethylammonium hydrogen sulfate. Without wishing to be bound by any particular theory, the inventors believe that, according to this embodiment, the hydrogen sulfate anion dehydrating component serves a function similar to that of the strong acids used according to other embodiments of this invention. Indeed, the inventors have discovered that the porous carbons made by the method wherein the dehydrating component and nonmetallic cationic component comprise two moieties of one compound, demonstrate superior qualities and a streamlined manufacturing process over porous carbons made by a conventional method. Other examples include ammonium hydrogen oxalate, ammonium dihydrogenphosphate and ammonium hydrogen phosphate.

The nonmetallic cationic component of the present invention may, under some circumstances, completely decompose to volatile products that are completely extruded from the product carbon leaving no trace in the product. Alternatively, the nonmetallic cationic component may, under some circumstances, decompose to products, only some of which are volatilized and extruded under the preparation conditions leaving a residue of the products that are not completely decomposed in the carbon product. For example, elemental analyses of carbon precursors comprising ammonium hydrogen sulfate prepared under a variety of processing temperatures in Table 1 suggests an instance where decomposition is less than complete. It is well-known within the art that ammonium hydrogen sulfate decomposes above 300° C. to gaseous products consisting of sulfur dioxide, sulfur trioxide, water, nitrogen and ammonia; see, for example, C. W. Weston, "Ammonium Compounds," in the *Encyclopedia of Chemical Technology* 4th ed., Vol. 2, pp. 692-708; Wiley-Interscience: New York, 1995. Analysis of the data reveals a piecemeal pattern of decomposition: most of the sulfur is absent from the sample at 300° C. whereas a significant amount of nitrogen remains at 1050° C.

TABLE 1

Elemental composition and BET surface area of carbon processed at different temperatures

| Processing Temp. (° C.) | Wt. % Carbon | Wt. % Hydrogen | Wt. % Nitrogen | Wt. % Sulfur | Wt. % Oxygen | BET Surface Area ($m^2/g$) |
|---|---|---|---|---|---|---|
| 120 | 33.50 | 5.31 | 4.02 | 9.24 | — | — |
| 300 | 71.39 | 4.15 | 5.18 | 0.22 | — | 14 |
| 500 | 83.87 | 2.95 | 5.80 | 0.10 | — | 259 |
| 700 | 88.29 | 1.55 | 4.37 | — | 6.52 | 417 |
| 1050 | 94.09 | 0.45 | 1.39 | — | 2.43 | 1354 |

Composition: Sucrose (10 g); ammonium hydrogen sulfate (4 g); water (7 mL); carbonized under nitrogen.

The present method comprises curing a mixture under effective conditions. Preferably curing conditions are sufficient to effect complete dehydration of the carbohydrate and transformation to carbon, preferably a polymeric carbon.

According to one embodiment, curing conditions comprise heating the mixture in one heating stage. As used herein a heating stage is defined as a heat treatment carried out within a given temperature range. According to this embodiment, one stage conditions comprise a temperature preferably between about 80° C. and about 300° C. One stage conditions may further comprise an interval of time between about 1 and about 12 hours. One stage conditions may yet still further comprise an inert, reduced-pressure, or evacuated atmosphere. Exemplary inert atmospheres include those comprising nitrogen, argon or other noble gases. Alternatively, one stage conditions may comprise an atmosphere comprising air.

Alternatively, curing the mixture may comprise heating the mixture in two separate stages, referred to herein as first and second heating stages. It shall be understood that the labels "first" and "second" do not imply order in which these separate heating stages are to be executed. According to this embodiment, conditions for the first heating stage include a temperature between about 80° C. and about 120° C. If desired, the material heated to between 80° C. to 120° C. can be isolated as a paste and extruded into pellets. This material can be washed with water to remove the acid before the second heating stage to reduce the volatiles before the next step. Also according to this embodiment, first stage conditions may comprise heating within a given temperature range for a period of time between about 1 and about 6 hours.

Similarly, conditions for the second heating stage preferably comprise a temperature between about 140° C. and about 200° C. and heating at said temperature for an interval of time between about 1 and about 6 hours. According to one embodiment, the execution of said first stage precedes the execution of said second stage.

The present method further comprises (b) carbonizing the carbon under conditions effective to provide a porous carbon. The temperatures that comprise carbonization conditions are typically higher than those that comprise curing conditions. Preferably, carbonization shall be effective for increasing and/or introducing mesopores to the porous carbon.

Carbonization is typically carried out in a furnace capable of attaining the higher temperatures required. According to one embodiment, carbonization conditions comprise a temperature preferably between about 500° C. and about 1200° C. and more preferably between about 800° C. and about 1100° C. Carbonization is preferably carried out under an inert atmosphere. Exemplary inert atmospheres may include at least one selected from nitrogen, argon, and the noble gases. Alternatively or in addition, carbonization conditions may comprise a reduced pressure atmosphere. Carbonization conditions are preferably maintained for an interval of time between about 1 and about 4 hours.

Carbonization conditions may further comprise a preferred gas flow rate. That is, the atmosphere comprising carbonization conditions may be swept through the carbonization furnace at a given flow rate. As has been previously shown, there exists a relationship between the gas flow rate that comprises carbonization conditions and the surface area of the porous carbon produced thereby. In particular, it has been shown that low flow rates give porous products of higher surface area than porous products obtained using high flow rates. See Xing et al., "Optimizing Pyrolysis of Sugar Carbons for Use as Anode Materials in Lithium-Ion Batteries," (1996), J. Electrochem. Soc., 143, 3046-3052, herein incorporated by reference.

According to some embodiments, carbonization conditions comprise a furnace gas flow rate between about 0 oven vol/h and 16 oven vol/h. As used herein, the unit "oven vol/h" describes volume of gas through the oven per hour where the volume is taken as one oven volume of gas. Most preferably, conditions for carbonizing the porous carbon precursor comprise a flow rate of an inert gas between about 0.5 oven vol/h and about 1.5 oven vol/h. Conceivably, any inert gas may be used in the carbonization such as, for example, nitrogen, argon or the like.

The present method may further comprise an activation step effective for increasing the surface area and porosity of the porous carbon. Activation procedures are well known within the art and typically comprise treatment with steam, gases or chemical reagents applied after a porous carbon is obtained.

Activation procedures may be categorized as physical or chemical depending upon the agents employed. Physical activation typically comprises treatment with high-temperature steam or carbon dioxide. Chemical activation may include the use of, for example, phosphoric acid, zinc chloride or potassium hydroxide. According to some embodiments of the present invention, the present method further comprises at least one activation procedure. Also according to this embodiment, said activation procedure may be chemical or physical or some combination of both and may be selected from the group consisting of high-temperature steam, carbon dioxide, phosphoric acid, zinc chloride and potassium hydroxide. Preferably, an activation procedure comprises treatment with carbon dioxide gas. Preferably, the activation step occurs after carbonization. Activation procedures may further comprise a soak time and temperature. As used herein, the soak time shall be defined as the duration of a given activation treatment at a given temperature. Each activation parameter including soak time, temperature and activation agent may individually and/or collectively be optimized to obtain an activation procedure that provides a carbon of desired porosity and surface area.

Carbonization and curing conditions may each further comprise a ramp time. As used herein the ramp time shall refer to the rate at which the mixture is heated between the initial and final temperatures. Both curing and carbonization conditions may feature a given ramp time. The curing and carbonization ramp times may be the same or different. The ramp time is determined by determining the difference between the final and initial temperatures and dividing by the total amount of time elapsed in warming from the initial temperature to the final temperature. Recitation of a ramp time assumes a constant heating rate.

It has been discovered by the present inventors that changes in the ramp time can have a marked effect on the surface area of the porous carbons produced by the present method. According to one embodiment, the present method further comprises a ramp time for the carbonization step that is at least 5 hours. Also according to this embodiment, it is preferable that the ramp time is at least 10 hours in duration. According to some embodiments, extended ramp times result in marked increases in surface area. In certain preferred embodiments, the present methods result in a material whose pore size distribution has two or more separate peaks when pore volume distribution is plotted against pore size.

Porous Carbon Made According to the Present Method

The present invention further provides for a porous carbon made according to the method of the present invention. In particular, the present invention claims a mesoporous carbon made by a method comprising (a) curing a mixture under conditions effective to provide a carbon; and (b) carbonizing the carbon under conditions effective to provide a porous carbon. The porous carbon is characterized by an average pore diameter between about 2 nm and about 50 nm; and a surface area between about 100 $m^2/g$ and about 3000 $m^2/g$. In preferred embodiments, the porous carbon has a pore size distribution that includes two or more peaks when incremental pore volume is plotted as a function of pore size. The peaks may be, for example, between about 0.5 to 1.0 nm and between about 1.0 to 5.0 nm.

Figure 1:
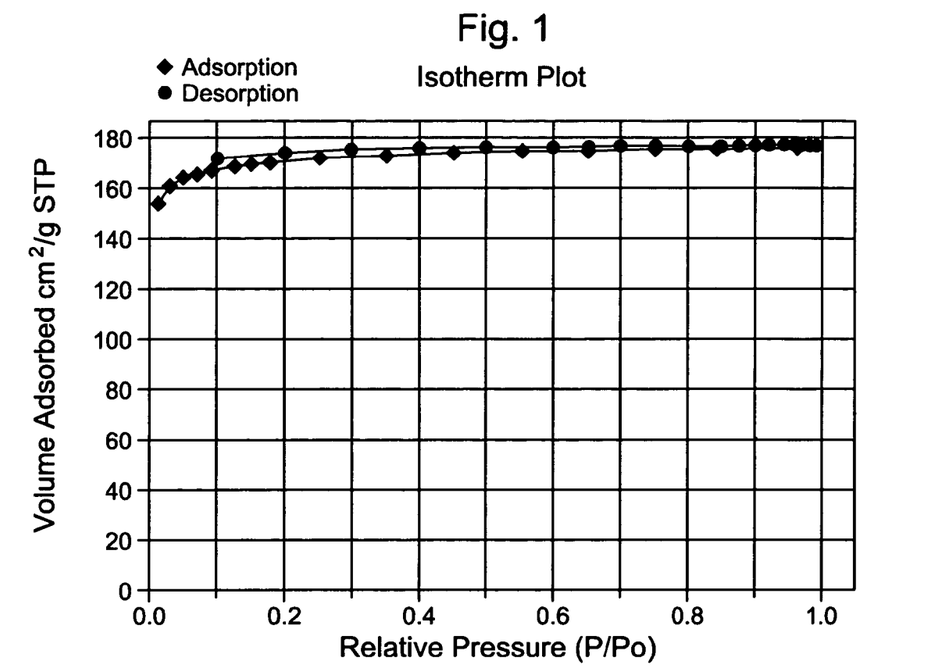
FIG. 1 is a nitrogen isotherm of porous carbon made without a nonmetallic cationic component.
Figure 2:
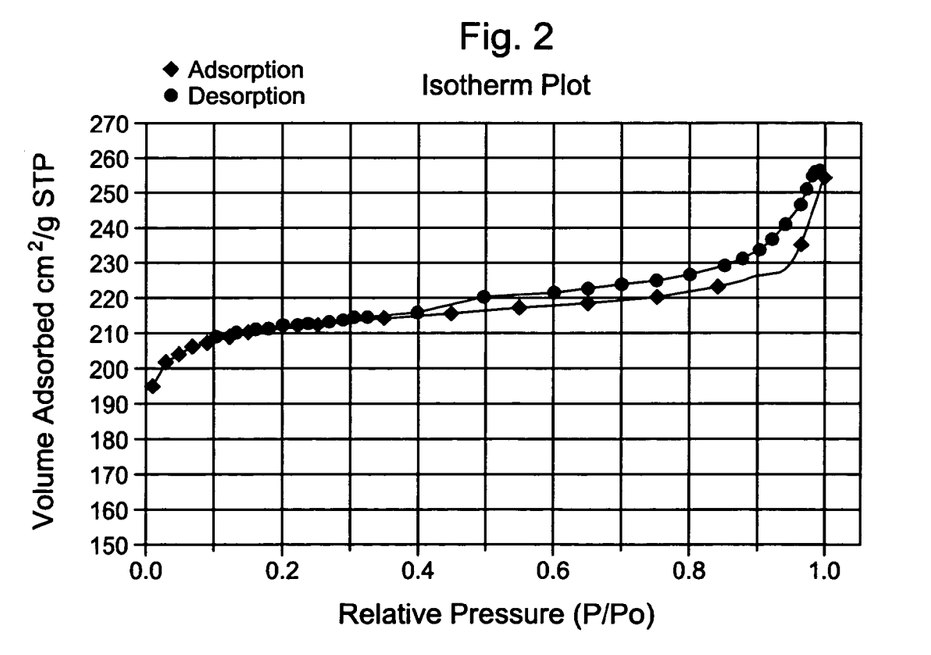
FIG. 2 is a nitrogen isotherm of porous carbon made with a nonmetallic cationic component.
Figure 3:
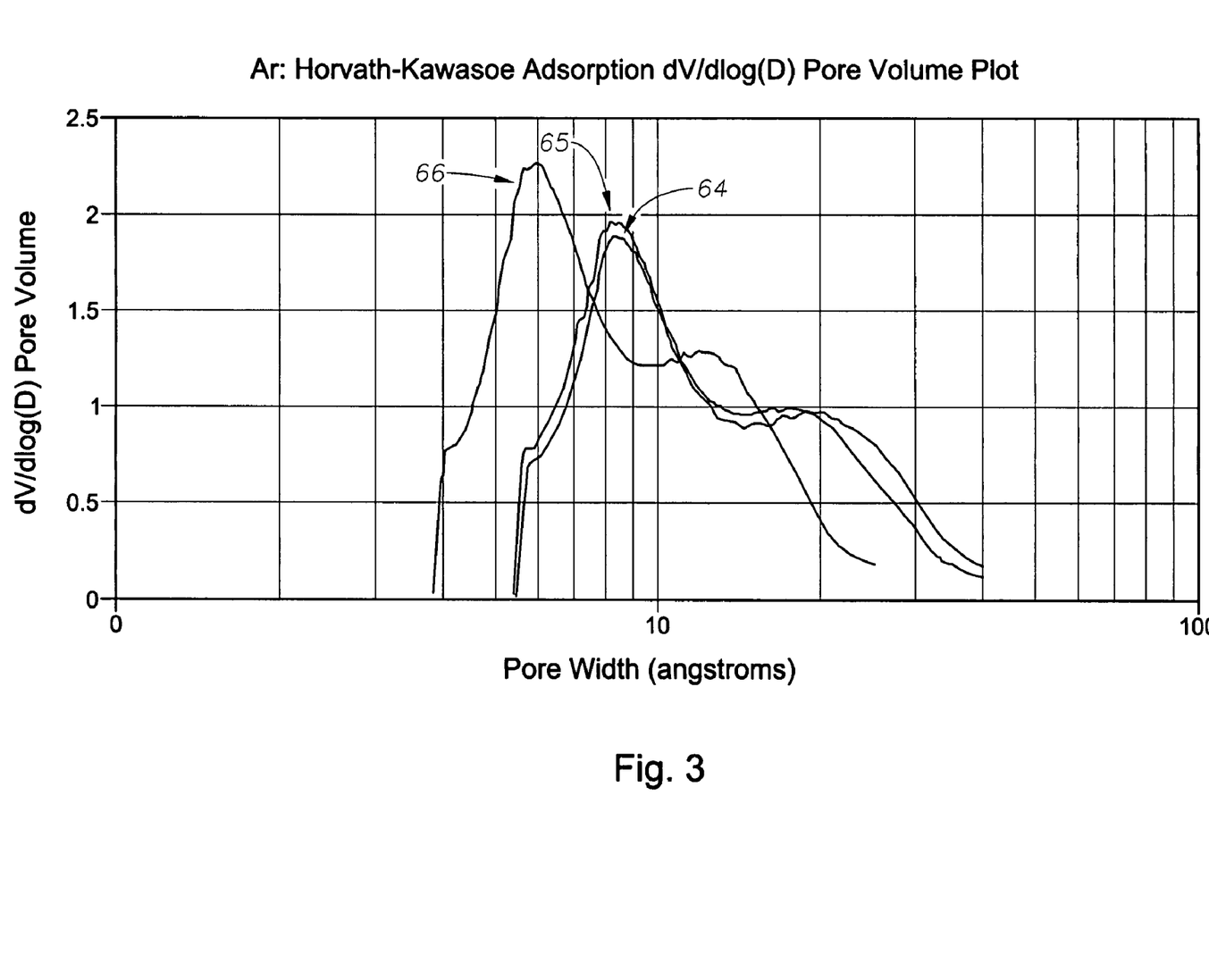
FIG. 3 is a plot of pore volume distribution as a function of pore size for a porous carbon in accordance with a preferred embodiment of the present invention.

The BJH method using nitrogen adsorption was used to measure the pore size distribution in the range of 1.7 to 300 nm. This method for determining pore size distribution is described in Barrett, E. P., L. G. Joyner, and P. P. Halenda (1951). "Determination of Pore Volume and Area Distributions in Porous Substances," *J. Am. Chem. Soc.* vol. 73, pp. 373-380 and is well-known in the art. Using this technique it is found that the average pore size distribution of the porous carbons made by this technique are greater than 2 nm. Since the BJH method is limited to pores larger than 1.7 nm, only part of the pore size distribution could be measured and micropore analysis using argon was used for some of the carbons. The pore size distribution in the 0.5 to 4 nm range was measured using argon and the Horvath-Kawazoe method described in Horvath, G.; Kawazoe, K., *J. Chem. Eng. Jpn.* 1983 pp. 470. Using this method it was found that the carbons have a bimodal pore size distribution with the first peak in the 0.5 to 1.0 nm range and the second in the 1.0 to 5.0 nm range. FIG. 3, which gives pore volume data for the porous carbons of Examples 64, 65, and 66 illustrates this characteristic.

Although the current method could be used to produce a porous carbon possessing one of many possible average pore diameters, it is preferred that the porous carbon be characterized by an average pore diameter between about 2 nm and about 50 nm. An average pore diameter between about 2 nm and about 50 nm substantially corresponds to the mesopore region described hereinabove. It is still more preferred that the porous carbon be characterized by an average pore diameter between about 2 nm and about 30 nm.

The porous carbon of the present invention preferably has a high surface area. Although it is conceivable that porous carbons made according to the present method could have any surface area within the range normally found for activated or porous carbons, it is preferred that the surface area is between about 100 $m^2/g$ and about 3000 $m^2/g$. It is more preferable that the present porous carbon be characterized by a surface area that is at least 900 $m^2/g$.

The porous carbons made according to the present method may be characterized by any one of a number of possible densities. According to some embodiments, the porous carbons made according to the present method are characterized by a density that is at least 0.4 $g/cm^3$.

The porous carbons made according to the present method will be further characterized by a given capacitance. It shall be understood that the capacitance may be reported as the total capacitance in F, the volumetric capacitance in $F/cm^3$, or the gravimetric capacitance in F/g. The capacitance will depend upon the electrical properties of the electrode material as well as the surrounding electrolyte. Typically, the electrolyte will comprise an ionic component dissolved in a polar solvent. Electrolytes are typically divided into aqueous or organic types. According to some embodiments, the porous carbon is characterized by a volumetric capacitance measured in an organic electrolyte that is preferably at least 40 $F/cm^3$ and more preferably at least 60 $F/cm^3$. Preferably, the organic electrolyte comprises 1 M $NEt_4BF_4$ (tetraethylammonium tetrafluoroborate) and 1:1 dimethylcarbonate: propylene carbonate.

Method of Making Carbonaceous Electrodes

In yet another aspect, the present invention comprises carbonaceous electrodes fashioned from the present inventive mesoporous carbon and methods for making same. The present mesoporous carbons are ideal for electrodes used for energy storage via double-layer ultracapacitors and desalination of brackish waters via capacitive deionization technology because they have high conductivity, high surface areas, high mesoporosity and high capacitance. In particular, carbons containing mesoporous have an advantage in certain liquid applications in that they permit for high surface areas while permitting for the free migration of electrolyte ions. The present carbons lend themselves to be used as very thin carbon electrodes giving increased power because they allow more rapid transport of ions into and out of the carbon. Moreover, thin plates can easily be packed into an array of electrodes to produce a compact device.

Capacitive Deionization Technology

The present inventive method of making carbonaceous electrodes can be used to manufacture electrodes for capacitive deionization technology (CDT) less expensively than heretofore possible and possessing the requisite balance between pore size and surface area.

The present method realizes several advantages over the prior art method comprising impregnating a carbon paper support with a water resorcinol formaldehyde solution followed by extraction and pyrolysis. The present method of making a porous carbon electrode comprises (a) introducing a mixture to a substrate to provide an impregnated substrate; (b) curing the impregnated substrate under conditions effective to provide a carbonaceous substrate; and (c) carbonizing the carbonaceous substrate under conditions effective to provide a porous carbon electrode. As described above, the mixture comprises (i) at least one carbohydrate, (ii) at least one dehydrating component, and (iii) at least one nonmetallic cationic component.

The electrodes formed in this manner are designed to overcome the inherent brittleness and high resistive losses typically associated with aerogel electrodes. The substrate is intended to confer electrical conductivity, strength and flexibility to the electrodes of the present invention. Suitable substrates according to the present invention will be those that cleanly become an integral part of the carbonaceous CDT electrode upon pyrolysis while simultaneously conferring to the inventive electrode the properties of strength, flexibility and electrical conductivity. While it is anticipated that a large number of possible substrates could conceivably be used in the present invention, there exist a number of specialty papers and cloths that are preferred substrates for use in the present CDT electrodes. The substrates may be cloths woven from fibers or papers of nonwoven fibers. Exemplary substrates include non-woven carbon paper, non-woven paper and woven phenolic cloth.

Introducing a mixture to the substrate is typically done by soaking the substate in the mixture. The mixtures used are substantially similar to those outlined above in connection with other aspects of this invention.

Curing and carbonizing steps are substantially similar to the steps outlined above in connection with other aspects of this invention. According to some embodiments, wetted substrates required an additional heating step to cross-link and thereby stabilize the polymeric substrates prior to pyrolysis. As before, it was discovered that ramp times, carbonization temperatures and gas flow furnace rates all had a substantial effect upon the porous properties of the electrodes.

The CDT electrodes of the present invention shall be characterized by a high discharge energy. The efficacy of CDT electrodes is measured according to the cumulative discharge energy. The cumulative discharge energy gives an indication of the saturation amount of electrolyte that can be stored in the electrode. Higher cumulative discharge energies correlate with higher electrolyte saturation. According to some embodiments, the CDT electrode is characterized by a cumulative discharge energy that is at least 3.0 J/cm$^3$.

Ultracapacitors

The present method may also be used to make ultracapacitors. Mesoporous carbons made according to the present invention can be used in porous carbon electrodes of very high surface area and therefore high capacitance. Mesoporous carbons of high capacitance necessarily have high-energy storage densities. The capacitance of porous materials increases linearly with specific surface area. Therefore, a carbon material with a capacitance of 20 µF./cm$^2$ and a surface area of 2000 m$^2$/g would have a capacitance of 400 F/g if all of the surface were electrochemically accessible. Microporous carbons are typically characterized by a low fraction of electrochemically surface area and measured capacitance values are therefore about 10-20% of theoretical. Mesoporous carbons can realize an advantage in energy and power density, realizing an improvement in ultracapacitors made therefrom.

The ultracapacitors of the present invention may be made from porous carbon powders made as outlined above according to another aspects of this invention. Alternatively, the ultracapacitors may be supported on a substrate as was done above in still another aspect of this invention. In both cases, the ultracapacitor electrodes shall comprise thin films that may be assembled into an ultracapacitor device. See, for example, U.S. Pat. No. 6,279,293 to Bell and references cited therein, herein incorporated by reference.

The ultracapacitors of the present invention shall be characterized by a high energy storage density. In particular, according to some embodiments, the ultracapacitor electrodes of the present invention can be characterized by a gravimetric capacitance in an organic electrolyte that is preferably at least 50 F/g; more preferably at least 100 F/g.

EXAMPLES

It is believed that this disclosure and the examples recited herein are sufficient to fully describe the present invention and allow one skilled in the art to practice the invention. No limitations upon the scope of the invention are to be drawn from the examples included hereinbelow. It shall be understood that the scope of the invention is limited only by the claims.

Examples 1-4

Porous carbons were prepared both with and without a cationic component at both low and high furnace gas flow rates. A mixture consisting of sucrose (10 g), water (7 mL), sulfuric acid (2.24 g) and, if used, ammonium sulfate (1.8 g), was heated at a temperature of 100° C. for 6 h under an atmosphere comprising an inert gas or air. The mixture was subsequently heated at 160° C. to provide a black solid. A final treatment at a temperature over 900° C. under a nitrogen atmosphere at a furnace gas flow rate of 16 oven vol/h or 0.6 oven vol/h provided the porous carbon. The BET surface area and BJH average pore diameter for the porous carbons obtained thereby are shown in Table 2.

TABLE 2

Surface Area and Pore Diameter of Porous Carbons Made in the Absence and Presence of Cationic Components and at Various Flow Rates

| Example | Flow Rate (oven vol/h) | Cationic Component | Surface Area (m$^2$/g) | Average Pore Diameter (nm) |
|---|---|---|---|---|
| 1 | 16 | None | 26 | 1.8 |
| 2 | 0.6 | None | 521 | 2.4 |
| 3 | 16 | (NH$_4$)$_2$SO$_4$ | 366 | 4.0 |
| 4 | 0.6 | (NH$_4$)$_2$SO$_4$ | 960 | 4.0 |

As can be seen in Table 2, reduction of flow rates to 0.6 oven vol/h results in much greater surface area. It can also be seen from Table 2 that use of an ammonium pore former increases both surface area and average pore diameter.

Examples 4B-4C

The general method is equally applicable using strong carboxylic acids as the dehydrating agent. It was discovered that oxalic acid in the presence of a cationic component could be used in the present invention. The general method of Examples 1-4 employing carbonization at 1000° C. in nitrogen with no furnace gas flow was used. As shown in Table 3 porous carbons can be prepared with or without CTAB to provide porous carbons of differing surface areas.

TABLE 3

Formulation and Properties of Porous Carbons Using Oxalic Acid.

| Example | CTAB | Oxalic Acid | Sucrose | Water | BET Surface Area (m$^2$/g) |
|---|---|---|---|---|---|
| 4B | 0.0 | 1.0 | 10 | 7 | 654 |
| 4C | 0.22 | 1.1 | 10 | 7 | 1020 |

Examples 5-18

Porous carbons were prepared according to the following procedure. A mixture comprising sucrose (10 g), water (7 mL), sulfuric acid (1.12 g) and, if used, 0.45 g of a compound containing a nonmetallic cationic component, the compound being selected from among ammonium sulfate (Example 6), tetramethylammonium bromide (Example 7), tetraethylammonium tetrafluoroborate (Example 8), tetrapropylammonium bromide (Example 9), tetrabutylammonium bromide (Example 10), cetyltrimethylammonium bromide (Example 11), triethylamine hydrochloride (Example 12), tetramethylphosphonium chloride (Example 13), sodium sulfate (Example 14), triethylamine (Example 15) cesium sulfate (Example 16), 1,4-diaminobutane (Example 17) and triphenylmethanol (Example 18) was heated to 100° C. and 160° C. as described in Examples 1-4. The samples were further carbonized at 900° C. under a flow rate of 16 oven vol./h. Other possible precursors for the nonmetallic cation include tetrahexylammonium chloride (N[(CH$_2$)$_5$CH$_3$]$_4$Cl), tetrapentylammonium bromide (N[(CH$_2$)$_4$CH$_3$]$_4$Br), tetraheptylammonium bromide (N[(CH$_2$)$_6$CH$_3$]$_4$Br), tetraoctylammonium bromide (N[(CH$_2$)$_7$CH$_3$]$_4$Br), trimethyldodecylammonium chloride (CH$_3$(CH$_2$)$_{11}$N(CH$_3$)$_3$Cl), trimethyltetradecylammonium bromide (CH$_3$(CH$_2$)$_{13}$N(CH$_3$)Br), trimethylhexadecylammonium chloride (CH$_3$(CH$_2$)$_{15}$N(CH$_3$)$_3$Cl) and methyltrioctylammonium chloride (CH$_3$N[(CH$_2$)$_7$CH$_3$]$_3$Cl) diaminobutane dihydrochloride (H$_2$N(CH$_2$)$_4$NH$_2$.2HCl), polyethylenimine hydrochloride (H(—NHCH$_2$CH$_2$—)$_n$HN$_2$.XHCl, tetraethylphosphonium bromide (PEt$_4$Br) and tetramethylphosphonium chloride (PMe$_4$Cl).

The results shown in Table 4 indicate that a wide variety of nonmetallic cationic components can be tolerated according to the present invention, giving preferred ranges of surface areas and desirable mesoporosity, while inorganic salts and amines tend to give less favorable results.

TABLE 4

Effect of Various Cationic Components Upon Surface Area and Pore Diameter in Porous Carbons

| Example | Cationic Component | BET Surface Area (m$^2$/g) | Hysteresis (Y/N) | BJH Avg. Pore Dia. (nm) |
|---|---|---|---|---|
| 5 | None | 23 | N | 1.8 |
| 6 | Ammonium sulfate | 314 | Y | 7.2 |
| 7 | Tetramethylammonium bromide | 385 | Y | 6.5 |
| 8 | Tetraethylammonium tetrafluoroborate | 298 | Y | 3.9 |
| 9 | Tetrapropylammonium bromide | 368 | Y | 5.4 |
| 10 | Tetrabutylammonium bromide | 238 | Y | 2.7 |
| 11 | Cetyltrimethylammonium bromide | 457 | Y | 6.0 |
| 12 | Triethylamine hydrochloride | 187 | Y | 5.1 |
| 13 | Tetramethylphosphonium chloride | 253 | Y | 4.6 |
| 14 | Sodium sulfate | 14 | N | 1.8 |
| 15 | Triethylamine | 0.1 | N | — |
| 16 | Cesium sulfate | 0.1 | N | — |
| 17 | 1,4-diaminobutane | 153 | Y | 2.3 |
| 18 | Triphenylmethanol | 33 | Y | 2.8 |

Examples 19-28

Porous carbons were prepared according to the following procedure. A mixture consisting of a carbohydrate (10 g), water (7 mL), sulfuric acid (1.12 g) and, if used, 0.45 or 0.90 g of CTAB was heated to 100° C. and 160° C. as described in Examples 1-4. The samples were further carbonized at 900° C. under a flow rate of 16 oven vol./h.

The results shown in Table 5 indicate that a wide variety of carbohydrates can be tolerated according to the present invention, giving preferred ranges of surface areas and desirable mesoporosity.

TABLE 5

Effect of Various Carbohydrates with and without a Cationic Component on the Surface Area and Pore Diameter of Porous Carbons

| Example | Carbohydrate | Quantity of CTAB (g) | BET Surface Area (m$^2$/g) | Hysteresis (Y/N) | BJH Avg. Pore Dia (nm) |
|---|---|---|---|---|---|
| 19 | Glucose | 0 | 3 | N | — |
| 20 | Glucose | 0.90 | 250 | Y | 8.3 |
| 21 | Fructose | 0 | 23 | N | 2.5 |
| 22 | Fructose | 0.90 | 407 | Y | 3.2 |
| 23 | HFC | 0 | 64 | N | 2.8 |
| 24 | HFC | 0.45 | 409 | Y | 6.3 |
| 25 | Lactose | 0 | 86 | N | 1.8 |
| 26 | Lactose | 0.45 | 334 | Y | 4.2 |
| 27 | Starch | 0 | 124 | N | 2.1 |
| 28 | Starch | 0.45 | 352 | Y | 5.7 |

HFC: High fructose corn syrup;
CTAB: cetyltrimethylammonium bromide

Examples 29-33

Porous carbons were prepared according to the following procedure. A mixture consisting of a sucrose (10 g), water (7 mL), and ammonium hydrogen sulfate was heated to 100° C.

and 160° C. as described in Examples 1-4 with the exception that ammonium hydrogen sulfate was used and sulfuric acid was not. The samples were further carbonized at 900° C. under a flow rate of 16 oven vol/h. As shown below in Table 6, it was discovered that is was possible to produce high surface area carbons in the absence of sulfuric acid. The results shown in Table 6 indicate that varying amounts of the nonmetallic cationic salts can be tolerated according to the present invention, giving preferred ranges of surface areas and desirable mesoporosity.

TABLE 6

Porous Carbons Formed in the Absence of a Strong Acid and the Effect on Surface Area and Pore Diameter

| Example | Ammonium Hydrogen Sulfate (g) | BET Surface Area (m$^2$/g) | Total Pore Vol (cc/g) | BJH Avg. Pore Dia (nm) |
|---|---|---|---|---|
| 29 | 1 | 177 | 0.12 | 4.5 |
| 30 | 2 | 277 | 0.19 | 6.8 |
| 31 | 3 | 373 | 0.26 | 7.5 |
| 32 | 4 | 422 | 0.31 | 7.7 |
| 33 | 6 | 347 | 0.24 | 8.2 |

Examples 34-38

Porous carbons were prepared according to the general procedure of Examples 1-4 with the addition that molar ratio of cationic component to strong acid was changed in each of Examples 34-38 as shown below in Table 7. The dependency of surface area on the molar ratio of cationic component to strong acid indicates a mechanistic relationship between the cationic component and the acid component.

TABLE 7

Effect of Acid to Cationic Component Ratio on Surface Area and Pore Diameter in Porous Carbons

| Example | Acid/(NH$_4$)$_2$SO$_4$ (mol/mol) | BET Surface Area (m$^2$/g) | Total Pore Volume (cc/g) | BJH Average Pore Diameter (nm) |
|---|---|---|---|---|
| 34 | 0.0 | 5 | 0.0004 | — |
| 35 | 0.42 | 131 | 0.10 | 3.5 |
| 36 | 0.84 | 207 | 0.20 | 5.7 |
| 37 | 1.68 | 366 | 0.32 | 6.7 |
| 38 | 3.35 | 378 | 0.32 | 6.9 |

Sugar quantity = 10 g, carbonized at 900° C. in nitrogen, flow rate 16 bed vol./h Example 39

The general procedure of Examples 1-4 was followed with the exception that tetramethylammonium bisulfate was used and sulfuric acid was not. As shown below in Table 8, it was discovered that it was possible to produce high surface area carbons in the absence of sulfuric acid.

TABLE 8

Properties of Porous Carbon Made in the Absence of Strong Acid Using Tetramethylammonium Hydrogen Sulfate as the Nonmetallic Cationic Component

| Example | NMe$_4$HSO$_4$ (g) | Sucrose (g) | Water (g) | BET Surface Area (m$^2$/g) |
|---|---|---|---|---|
| 39 | 4 | 10 | 7 | 233 |

Carbonized at 900° C. in nitrogen, flow rate 16 oven vol./h

Examples 40-41

The present method is equally applicable to carbohydrates that are soluble in water and those that are insoluble in water. It has been discovered, for example, that the present method is effective when the water-insoluble starch cellulose is selected as the carbohydrate. The general method of Examples 1-4 employing carbonization at 1050° C. in nitrogen with a furnace gas flow rate of 0.6 oven vol./h was used. As shown in Table 9 cellulose carbons can be prepared with and without ammonium sulfate to provide porous carbons of differing surface areas. During processing, the particles do not agglomerate indicating that the cellulose does not dissolve. Nonetheless, the solution appears to be able to penetrate the particles.

TABLE 9

Formulation and Properties of Porous Carbons Made from Cellulose

| Example | NH$_4$HSO$_4$ (g) | H$_2$SO$_4$ (g) | Cellulose (g) | Water (g) | BET Surface Area (m$^2$/g) |
|---|---|---|---|---|---|
| 40 | 0.0 | 2.24 | 10 | 7 | 541 |
| 41 | 1.8 | 2.24 | 10 | 7 | 1374 |

Examples 42-45

The general method of Examples 1-4 was used employing sucrose (10 g), H$_3$PO$_4$ (2.24 g), water (7 mL) and carbonization at 1050° C. in nitrogen at a furnace gas flow rate of 0.6 oven vol./h and 5 h ramp time unless otherwise indicated. It was discovered that phosphoric acid in the presence of a cationic component could be used in the present invention (Table 10). Phosphoric acid under low nitrogen flow conditions can give high surface area carbon, but does not show hysteresis in the nitrogen isotherm indicating the absence of mesoporosity (Example 42). The addition of an ammonium cationic component increases mesoporosity as demonstrated by the presence of hysterisis (Examples 43 and 44). Increasing the oven ramp time produced a porous carbon having a surface area greater than 2000 m$^2$/g (Example 45).

TABLE 10

Formulations and Properties of Porous Carbons Made Using Phosphoric Acid

| Example | Cationic Component | Quantity (g) | BET Surface Area (m$^2$/g) | Hysteresis (Y/N) | BJH Average Pore Diameter (nm) |
|---|---|---|---|---|---|
| 42 | None | — | 811 | N | 2.2 |
| 43 | CTAB | 0.45 | 784 | Y | 3.3 |

TABLE 10-continued

Formulations and Properties of Porous Carbons Made Using Phosphoric Acid

| Example | Cationic Component | Quantity (g) | BET Surface Area ($m^2/g$) | Hysteresis (Y/N) | BJH Average Pore Diameter (nm) |
|---|---|---|---|---|---|
| 44 | $(NH_4)_2SO_4$ | 1.8 | 1173 | Y | 2.7 |
| 45[a] | $(NH_4)_2SO_4$ | 1.8 | 2021 | Y | 2.8 |

[a] 10 h ramp time

Examples 46-51

Table 11 demonstrates the effect of various activation procedures and the properties of porous carbons obtained thereby. The surface area of the carbons can be further increased by physical activation with carbon dioxide or steam. These techniques are commonly used to prepare commercial porous carbons with surface areas greater than 1000 $m^2/g$ (Kinoshita 1988). In the case of activation procedures comprising carbon dioxide or high-temperature steam, the operative mechanism is conversion of a portion of the carbon to volatile products as depicted in equations (1) and (2) below.

$$C + CO_2 \rightleftharpoons 2CO \qquad (1)$$

$$C + H_2O \rightleftharpoons CO + H_2 \qquad (2)$$

TABLE 11

Surface Area and Pore Diameter of Porous Carbons from Various Activation Procedures

| Example | Activating Agent | Temperature (° C.) | Soak time (h) | Surface Area ($m^2/g$) | Average Pore Diameter (nm) |
|---|---|---|---|---|---|
| 46 | Nitrogen | 900 | 2 | 457 | 6.0 |
| 47 | Carbon dioxide | 950 | 3 | 965 | 2.8 |
| 48 | Carbon dioxide | 950 | 6 | 2474 | 2.5 |
| 49 | Carbon dioxide | 1000 | 5 | 2758 | 2.4 |
| 50 | Steam | 900 | 2 | 903 | 4.9 |
| 51 | Steam | 900 | 8 | 1738 | 3.7 |

Formulation:
CTAB/sucrose = 0.022,
$H_2SO_4$/sucrose = 0.112.

Examples 52-53

In Table 12 the effect of prolonged ramp times upon the properties of porous carbons is demonstrated. In Examples 52 and 53, the general method of Examples 1-4 was used employing specific weight ratios for ammonium sulfate: sucrose and sulfuric acid: sucrose: $(NH_4)_2SO_4$/sucrose=0.18, $H_2SO_4$/sucrose=0.224. The samples were carbonized at 1050° C. in a gas furnace flow rate of 0.6 oven vol./h.

In Example 52, a porous carbon made according to the present method and featuring a ramp time of 5 hours is characterized by a surface area of 960 $m^2/g$ and an average pore diameter of 4.0 nm. By comparison, Example 53 describes a porous carbon made according to the same method but featuring a ramp time of 10 hours wherein such carbon is characterized by a surface area of 1913 $m^2/g$ and an average pore diameter of 2.4 nm.

TABLE 12

Surface Area and Pore Diameter of Porous Carbons at Various Ramp Times

| Example | Ramp Time (h) | Surface Area ($m^2/g$) | Average Pore Diameter (nm) |
|---|---|---|---|
| 52 | 5 | 960 | 4.0 |
| 53 | 10 | 1913 | 2.4 |

CDT Testing

The CDT test apparatus comprised a reservoir holding a 10,000 ppm NaCl solution and two 2"×3" electrodes partially submerged (2") in the solution. Electrical contact from the electrodes to the power system was made using alligator clips. The power system consisted of a power source, relay and a resistor. The experiments were computer driven by Control EG software. The experimental sequence consisted of charging the electrodes at 1.2 V for 30 minutes and discharging the cell through a resistor while measuring the corresponding voltage drop.

Saturation of the electrodes is attained after charging to 1.2 V and observing a flat line on the computer display. The discharge energy is calculated from the discharge curve. The energy can be calculated using the equation $E = V^2/R \cdot T$ where E=energy (J), V=voltage, R=resistance of the resistor, and T=time in seconds.

CDT electrodes supported on various substrates were prepared and tested. The substrates used were non-woven carbon paper substrate that is 100 $g/m^2$ and 1 mm thick and a woven phenolic cloth (American Kynol, 150 $g/m^2$).

Examples 54-60

The substrates were soaked in a carbohydrate/ammonium salt solution where the carbohydrate preferably comprises sucrose. The wetted substrates were heated to about 100° C. for about 6 hours, then 160° C. for about 6 hours, under air. The carbonization temperature will vary depending upon the ammonium salt used, for example, between 850° C. to 1000° C. In addition, the flow gases used during carbonization can markedly affect the final state of the porosity of the porous carbon so obtained. Thus, according to some embodiments of the present method carbonization conditions comprise heating the sample comprising CTAB at 900° C. for 2 h under a carbon dioxide atmosphere. Alternatively, carbonization conditions may comprise heating a sample comprising ammonium sulfate at 900° C. for 2 h under a nitrogen atmosphere.

The substrates were soaked with the sucrose formulation shown in Table 13. The wet substrates were heated to 100° C. for 6 h and 160° C. for 6 h in air. The CTAB sample was heated at 900° C. for 2 h in $CO_2$ and the $(NH_4)_2SO_4$ sample was heated at 900° C. for 2 h in $N_2$.

TABLE 13

Porous Carbons Applied to Substrates For CDT Testing

| Example | Pore Former | Quantity (g pore former/ g sucrose) | Quantity (g $H_2SO_4$/ g sucrose) | Quantity (mL water/ g sucrose) | BET Surface Area ($m^2/g$) |
|---|---|---|---|---|---|
| 54 | CTAB | 0.045 | 0.112 | 0.7 | 654 |
| 55 | $(NH_4)_2SO_4$ | 0.18 | 0.224 | 0.7 | 559 |

The test results for the various substrates using sucrose carbon are shown in Table 14. The results are compared to the best RF based electrodes and in all cases the carbohydrate-based electrodes are superior.

TABLE 14

Extracted Energy from RF and Sucrose/Ammonium Based Electrodes Supported on Carbon and Phenolic Substrates

| Example | Carbon Source | Substrate | Energy (J/cc) |
|---|---|---|---|
| 56 | Resorcinol/formaldehyde | Carbon | 3.7 |
| 57 | Sucrose/$(NH_4)_2SO_4$ | Carbon | 6.0 |
| 58 | Sucrose/CTAB | Carbon | 5.9 |
| 60 | Sucrose/CTAB | Phenolic | 6.0 |

Examples 61-66

Capacitance Results For Porous Carbons

A sucrose/CTAB sample was activated in carbon dioxide at 950° C. for various lengths of time to produce carbons with surface areas of 965 $m^2/g$ (3 h, Example 61, same as example 47), 2474 $m^2/g$ (6 h, Examples 62 and 63, same as example 48) and 1814 $m^2/g$ (5 h, Example 64). Example 65 was prepared from fructose and ammonium sulfate and activated with carbon dioxide. The specific weight ratio for ammonium sulfate:fructose=0.18 and for sulfuric acid:fructose=0.224. The sample was activated 900° C. for 8 hours in carbon dioxide. The single cell test results are shown in Table 15. Examples 61, 62, 64, 65 and 66 were tested in organic (1 M $NEt_4BF_4$ in 1:1 DMC/PC) electrolytes. As expected, the higher the surface areas correlated with higher gravimetric capacitance. Example 63 was tested in aqueous electrolyte ($H_2SO_4$). These tests show that these carbons show very high capacitance in both organic and aqueous electrolytes. Capacitance was measured by discharging through a 100 Ω resistor from 2 V for organic electrolyte and from 1.0 V for aqueous electrolyte. Example 66 was prepared from sucrose and ammonium sulfate and activated with carbon dioxide. The specific weight ratios for ammonium sulfate:sucrose=0.09 and sulfuric acid:sucrose=0.224. The sample was activated at 900° C. for 10.5 hours in carbon dioxide.

TABLE 15

Comparison of the Capacitance of Carbohydrate Based Carbons

| Example | Density (g/cc) | BET Surface Area ($m^2/g$) | BJH Average Pore Dia. (nm) | Electrolyte Type | Capacitance (F/g) | Capacitance (F/cc) |
|---|---|---|---|---|---|---|
| 61 | 0.69 | 965 | 2.8 | organic | 58 | 90 |
| 62 | 0.43 | 2474 | 2.5 | organic | 118 | 51 |
| 63 | 0.43 | 2474 | 2.5 | aqueous | 296 | 127 |
| 64 | 0.66 | 1814 | 2.5 | organic | 96 | 64 |
| 65 | 0.81 | 1712 | 2.3 | organic | 123 | 100 |
| 66 | 0.61 | 1992 | 2.7 | organic | 131 | 80 |

While the present invention has been disclosed and described in terms of preferred embodiments, the invention is not limited to the preferred embodiments. For example, the relative amounts of carbohydrate, dehydrating agent, and pore-former can be varied. In the claims that follow, any recitation of steps is not intended as a requirement that the steps be performed sequentially, or that one step be completed before another step is begun, unless explicitly so stated.

What is claimed is:

1. A method of making a porous carbon comprising
   (a) curing a mixture under conditions effective so as to produce a cured carbon, said mixture comprising:
      (i) at least one carbohydrate,
      (ii) at least one dehydrating component, and
      (iii) at least one pore-forming agent comprising a nonmetallic cation of a nonmetal salt; and
   (b) carbonizing the cured carbon under conditions effective to provide a porous carbon having a surface area between about 100 m2/g and about 3000 m2/g, wherein said at least one pore forming agent comprises an ammonium cation, wherein step (a) includes removing substantially all of the water from the mixture and wherein step (a) includes producing a porous monolith.

2. The method according to claim 1, further comprising a step of grinding the porous monolith.

3. The method according to claim 1 wherein said dehydrating component and said nonmetallic ammonium cation of a nonmetal salt comprise two moieties of one compound.

4. The method according to claim 3 wherein the compound, which comprises the dehydrating component and the nonmetallic ammonium cation, is selected from the group consisting of ammonium hydrogen sulfate (($NH_4$)$HSO_4$), tetramethylammonium hydrogen sulfate ($N(CH_4)_4HSO_4$), tetraethylammonium hydrogen sulfate ($N(CH_2CH_3)_4HSO_4$), tetrapropylammonium hydrogen sulfate ($N(CCH_2CH_2H_3)_4HSO_4$), tetrabutylammonium hydrogen sulfate ($N(CH_2CH_2CH_2CH_3)_4HSO_4$), tetrahexylammonium hydrogen sulfate ($N[(CH_2)_5CH_3]_4HSO_4$), tetraheptylammonium hydrogen sulfate ($N[(CH_2)_6CH_3]_4HSO_4$), tetraoctylammonium hydrogen sulfate ($N[(CH_2)_7CH_3]_4HSO_4$), trimethyldodecylammonium hydrogen sulfate ($CH_3(CH_2)_{11}N(CH_3)_3HSO_4$), trimethyltetradecylammonium hydrogen sulfate ($CH_3(CH_2)_{13}N(CH_3)_3HSO_4$), trimethylhexadecylammonium hydrogen sulfate ($CH_3(CH_2)_{15}N(CH_3)_3HSO_4$), ammonium hydrogen oxalate (($NH_4$)$HC_2O_4$), ammonium dihydrogenphosphate (($NH_4$)$H_2PO_4$), ammonium hydrogen phosphate (($NH_4$)$_2HPO_4$), and methyltrioctylammonium hydrogen sulfate ($CH_3N[(CH_2)_7CH_3]_3HSO_4$).

5. The method according to claim 1 wherein said at least one pore-forming agent is substantially free of hydroxides and amines.

6. The method according to claim 1 wherein step (a) includes a first heating stage and a second heating stage and wherein said first heating stage is executed before said second heating stage.

7. The method according to claim 6 wherein said first heating stage is carried out at a temperature between about 80° C. and about 120° C. and lasts between about 1 and about 6 hours.

8. The method according to claim 6 wherein said first heating stage further includes forming the material from the first heating stage into pellets.

9. The method according to claim 8 wherein said first heating stage further includes washing the material from the first heating stage with water.

10. The method according to claim 6 wherein said second heating stage is carried out at a temperature between about 140° C. and about 200° C. and lasts between about 1 and about 6 hours.

11. The method according to claim 6 wherein at least one of said first or second heating stages is carried out in an atmosphere selected from the group consisting of nitrogen, argon, air and combinations thereof.

12. The method according to claim 1 wherein step (a) comprises a single heating stage.

13. The method according to claim 1 wherein conditions for (a) curing a mixture include a pressure less than one atmosphere.

14. The method according to claim 1 wherein carbonization is carried out at a temperature between about 500° C. and about 1200° C. and for an interval of time between about 1 and about 4 hours.

15. The method according to claim 1 wherein carbonization is carried out under an inert atmosphere.

16. The method according to claim 1 wherein carbonization is carried out under a reduced pressure atmosphere.

17. The method according to claim 1 wherein carbonization is carried out at a furnace gas flow rate between about 0 oven vol/h and 16 oven vol/h.

18. The method according to claim 1 wherein carbonization is carried out at a furnace gas flow rate between about 0.5 oven vol/h and about 1.5 oven vol/h.

19. The method according to claim 1, further comprising a step of activation of said porous carbon.

20. The method according to claim 19 wherein said activation comprises treatment of said porous carbon with at least one selected from high-temperature steam, carbon dioxide, phosphoric acid, zinc chloride and potassium hydroxide.

21. The method according to claim 1 wherein said carbonization step has a ramp time of at least 5 hours.

22. The method according to claim 1 wherein said carbonization step has a ramp time of at least 10 hours.

23. The method according to claim 1 wherein said at least one carbohydrate is selected from the group consisting of glucose, fructose, maltose, sucrose, galactose, corn syrup, high-fructose corn syrup, starch, cellulose, lactose, glyceraldehydes, dihydroxyacetone, and cellobiose.

24. The method according to claim 1 wherein curing step (a) consists of adding an aqueous solution of at least one cationic nonmetal salt and at least one dehydrating component to the at least one carbohydrate followed by heat processing.

25. The method according to claim 3 wherein said nonmetallic ammonium cation has the formula $NR^1R^2R^3R^4$, wherein $R^1$, $R^2$, $R^3$, and $R^4$ may be the same or different and selected from the group consisting of H, $CH_3$, $CH_2CH_3$, $CH_2CH_2CH_3$, $CH(CH_3)_2$, $CH_2(CH_2)_2CH_3$, $CH(CH_3)CH_2CH_3$, $CH_2CH(CH_3)_2$, $C(CH_3)_3$, $CH_2(CH_2)_{14}CH_3$, $CH_2(CH_2)_4CH_3$, $CH_2(CH_2)_5CH_3$, $CH_2(CH_2)_3CH_3$, $CH_2(CH_2)_6CH_3$, $CH_2(CH_2)_{10}CH_3$, $CH_2(CH_2)_{12}CH_3$, and any combination thereof.

26. The method according to claim 19 wherein the activation step is carried out after carbonization.

27. The method according to claim 19 wherein the activation step comprises treatment with carbon dioxide.

28. A method of making a porous carbon comprising
(a) curing a mixture under conditions effective so as to produce a cured carbon, said mixture comprising:
 (i) at least one carbohydrate,
 (ii) at least one dehydrating component, and
 (iii) at least one pore-forming agent comprising a nonmetallic cation of a nonmetal salt; and
(b) carbonizing the cured carbon under conditions effective to provide a porous carbon having a surface area between about 100 m²/g and about 3000 m²/g, wherein said at least one pore forming agent comprises an ammonium cation, and wherein said at least one carbohydrate is selected from the group consisting of sucrose, fructose and glucose.

29. The method according to claim 28 wherein step (a) includes removing substantially all of the water from the mixture.

30. The method according to claim 28 wherein said nonmetallic ammonium cation has the formula $NR^1R^2R^3R^4$, wherein $R^1$, $R^2$, $R^3$, and $R^4$ may be the same or different and selected from the group consisting of H, $CH_3$, $CH_2CH_3$, $CH_2CH_2CH_3$, $CH(CH_3)_2$, $CH_2(CH_2)_2CH_3$, $CH(CH_3)CH_2CH_3$, $CH_2CH(CH_3)_2$, $C(CH_3)_3$, $CH_2(CH_2)_{14}CH_3$, $CH_2(CH_2)_4CH_3$, $CH_2(CH_2)_5CH_3$, $CH_2(CH_2)_3CH_3$, $CH_2(CH_2)_6CH_3$, $CH_2(CH_2)_{10}CH_3$, $CH_2(CH_2)_{12}CH_3$, and any combination thereof.

31. The method according to claim 28 wherein the compound, which comprises the dehydrating component and the nonmetallic ammonium cation, is selected from the group consisting of ammonium hydrogen sulfate (($NH_4$)$HSO_4$), tetramethylammonium hydrogen sulfate ($N(CH_4)_4HSO_4$), tetraethylammonium hydrogen sulfate ($N(CH_2CH_3)_4HSO_4$), tetrapropylammonium hydrogen sulfate ($N(CCH_2CH_2H_3)_4HSO_4$), tetrabutylammonium hydrogen sulfate ($N(CH_2CH_2CH_2CH_3)_4HSO_4$), tetrahexylammonium hydrogen sulfate ($N[(CH_2)_5CH_3]_4HSO_4$), tetraheptylammonium hydrogen sulfate ($N[(CH_2)_6CH_3]_4HSO_4$) tetraoctylammonium hydrogen sulfate ($N[(CH_2)_7CH_3]_4HSO_4$), trimethyldodecylammonium hydrogen sulfate ($CH_3(CH_2)_{11}N(CH_3)_3HSO_4$), trimethyltetradecylammonium hydrogen sulfate ($CH_3(CH_2)_{13}N(CH_3)_3HSO_4$, trimethylhexadecylammonium hydrogen sulfate ($CH_3(CH_2)_{15}N(CH_3)_3HSO_4$), ammonium hydrogen oxalate (($NH_4$)$HC_2O_4$), ammonium dihydrogenphosphate (($NH_4$)$H_2PO_4$), ammonium hydrogen phosphate (($NH_4$)$_2HPO_4$), and methyltrioctylammonium hydrogen sulfate ($CH_3N[(CH_2)_7CH_3]_3HSO_4$).

32. The method according to claim 1 wherein at least one dehydrating component and at least one nonmetallic cation of a nonmetal salt are two separate compounds.

33. The method according to claim 32 wherein said dehydrating component is an acid.

34. The method according to claim 32 wherein said dehydrating component is selected from the group consisting of sulfuric, phosphoric, sulfurous, phosphorous, chlorous, hypochlorous, hypobromous, hypoiodous, periodic, perchloric, nitric, nitrous, iodic, hydrochloric, toluenesulfonic, oxalic, and methanesulfonic acids.

35. The method according to claim 32 wherein said nonmetallic cation is an ammonium cation having the formula $NR^1R^2R^3R^4$, wherein $R^1$, $R^2$, $R^3$, and $R^4$ may be the same or different and selected from the group consisting of H, $CH_3$, $CH_2CH_3$, $CH_2CH_2CH_3$, $CH(CH_3)_2$, $CH_2(CH_2)_2CH_3$, $CH(CH_3)CH_2CH_3$, $CH_2CH(CH_3)_2$, $C(CH_3)_3$, $CH_2(CH_2)_{14}CH_3$, $CH_2(CH_2)_4CH_3$, $CH_2(CH_2)_5CH_3$, $CH_2(CH_2)_3CH_3$, $CH_2(CH_2)_6CH_3$, $CH_2(CH_2)_{10}CH_3$, $CH_2(CH_2)_{12}CH_3$, and any combination thereof.

36. The method according to claim 32 wherein said at least one nonmetallic cation is that of a salt selected from the group consisting of ammonium sulfate (($NH_4$)$_2SO_4$), ammonium oxalate (($NH_4$)$_2C_2O_4$), tetramethylammonium bromide ($NMe_4Br$), tetraethylammonium tetrafluoroborate ($NEt_4BF_4$), tetrapropylammonium bromide ($NPr_4Br$), tetrabutylammonium bromide ($NBu_4Br$), cetyltrimethylammonium bromide (CTAB), triethylamine hydrochloride ($NEt_3·HCl$), tetrahexylammonium chloride ($N[(CH_2)_5CH_3]_4Cl$), tetrapentylammonium bromide ($N[(CH_2)_4CH_3]_4Br$), tetraheptylammonium bromide ($N[(CH_2)_6CH_3]_4Br$), tetraoctylammonium bromide ($N[CH_2)_7CH_3]_4Br$), trimethyldodecylammonium chloride ($CH_3(CH_2)_{11}N(CH_3)_3Cl$), trimethyltetradecylammonium bromide ($CH_3(CH_2)_{13}N(CH_3)Br$), trimethylhexadecylammonium chloride ($CH_3(CH_2)_{15}N(CH_3)_3Cl$) and methyltrioctylammonium chloride ($CH_3N[(CH_2)_7CH_3]_3Cl$) diaminobutane dihydrochloride ($H_2N(CH_2)_4NH_2·2HCl$), triphenylmethanol ($C_6H_5$)$_3COH$, polyethylenimine hydrochloride (H(—NHCH$_2$CH$_2$—)$_n$HN$_2$.XHCl, tetraethylphosphonium bromide (PEt$_4$Br) and tetramethylphosphonium chloride (PMe$_4$Cl).

37. A method of making a porous carbon comprising (a) curing a mixture under conditions effective so as to produce a cured carbon, said mixture comprising:

(i) at least one carbohydrate, (ii) at least one dehydrating component, and (iii) at least one pore-forming agent comprising a nonmetallic cation of a nonmetal salt; and (b) carbonizing the cured carbon under conditions effective to provide a porous carbon having a surface area between about 100 m$^2$/g and about 3000 m$^2$/g, wherein said dehydrating component and said nonmetallic cation of a nonmetal salt comprise two moieties of one compound, and wherein the dehydrating component is bisulfate.

* * * * *